(12) United States Patent
Crombez et al.

(10) Patent No.: US 6,443,535 B1
(45) Date of Patent: Sep. 3, 2002

(54) DECELERATION AND COMPENSATION FOR LOW VACUUM LEVELS IN A BRAKE-BY-WIRE BRAKING SYSTEM

(75) Inventors: Dale Scott Crombez, Livonia; Patrick Joseph Curran, Northville; Steven Lee Napier, Canton, all of MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/686,381

(22) Filed: Oct. 11, 2000

(51) Int. Cl.[7] .................................................. B60T 8/44
(52) U.S. Cl. ...................... 303/114.3; 303/31; 303/152; 60/397; 60/534
(58) Field of Search ................................ 303/177, 152, 303/113.3, 114.1, 114.2, 114.3, 115.3, 31, 62, 65; 60/534, 535, 397; 188/356, 357, 158

(56) References Cited

U.S. PATENT DOCUMENTS

| | | | |
|---|---|---|---|
| 3,734,571 A | | 5/1973 | Coccia |
| 4,738,112 A | * | 4/1988 | Nomura et al. ................ 60/721 |
| 4,778,225 A | * | 10/1988 | Rudolph et al. .......... 303/114.3 |
| 5,288,139 A | * | 2/1994 | Singleton et al. ............. 303/15 |
| 5,362,135 A | | 11/1994 | Riddiford et al. |
| 5,366,281 A | | 11/1994 | Littlejohn |
| 5,423,600 A | | 6/1995 | Riddiford et al. |
| 5,492,192 A | | 2/1996 | Brooks et al. |
| 5,539,641 A | | 7/1996 | Littlejohn |
| 5,549,361 A | | 8/1996 | Sorensen |
| 5,615,933 A | | 4/1997 | Kidston et al. |
| 5,762,407 A | | 6/1998 | Stacey et al. |
| 5,882,093 A | | 3/1999 | Enomoto |
| 5,927,829 A | | 7/1999 | Saga et al. |
| 5,938,297 A | * | 8/1999 | Whaite et al. ............ 303/114.3 |

FOREIGN PATENT DOCUMENTS

JP 59-156855 A * 9/1984

* cited by examiner

Primary Examiner—Pam Rodriquez
(74) Attorney, Agent, or Firm—Gregory P. Brown

(57) ABSTRACT

A system or method for compensating for low vacuum levels in a brake-by-wire system includes continually monitoring the level of vacuum in a vacuum booster. The state or condition of the vacuum source is also monitored to determine whether it is on or off. When the vacuum source is off, the level of vacuum is measured to determine whether it is at or below a critical level. If the level of vacuum is critically low, the vacuum source is turned on. If the vacuum level is not critically low, the hydraulic boost gain is modified in order to provide more braking pressure in response to brake force exerted at the brake pedal.

18 Claims, 2 Drawing Sheets

DECELERATION AND COMPENSATION FOR LOW VACUUM LEVELS IN A BRAKE-BY-WIRE BRAKING SYSTEM

TECHNICAL FIELD

The present invention relates generally to a regenerative brake-by-wire braking system that utilizes a vacuum booster. More specifically, the present invention relates to a braking system that compensates for low vacuum levels in the hydraulic brake booster due to the loss of a vacuum source.

BACKGROUND OF THE INVENTION

In recent years, electric automobiles using electric motors for driving vehicle wheels have attracted increasing attention or interest from the viewpoint of control of air pollution and reduction of noise generated by motor vehicles. Such an electric automobile may utilize so-called regenerative braking. To effect the regenerative braking, the electric motor for running the vehicle is placed in a power-generating state by regulating or limiting the supply of electric power to the electric motor, so that rotary motion of the drive wheels connected to the electric motor is converted into electric energy and is thus recovered, i.e., reused as driving force. The conversion of the rotary motion of the drive wheels and the electric energy involves consumption of kinetic energy, which is considered equivalent to braking of the drive wheels.

The above described brake apparatus is controlled to start regenerative braking when a driver releases his or her foot from an accelerator pedal of a vehicle. If a brake pedal is not depressed when the accelerator pedal is released, the extent of regenerative braking corresponds to engine braking performed by a conventional automobile driven by an internal combustion engine, for example. In this case, the brake apparatus is controlled to perform a weak regenerative braking. If the brake pedal is depressed, the brake apparatus is generally controlled to generate regenerative braking force in accordance with the degree or depth of depression in the brake pedal.

A typical mechanical brake system for an electric automobile, utilizing regenerative braking, includes a brake pedal and a vacuum-type booster. The vacuum-type booster is actuated according to the depression depth of the brake pedal. The vacuum tank for supplying vacuum is connected to the vacuum-type booster and the vacuum tank is equipped with a pump motor for reducing the pressure within the tank. The brake operating force generated by the vacuum-type booster is converted into a brake fluid pressure in a master cylinder. The master cylinder has a pressure sensor associated therewith for detecting the brake pressure and transmitting the sensed pressure to a brake controller which in turn causes brake actuating members to be actuated to apply mechanical brake force to the drive wheels.

In many instances, the vacuum source for the brake system, whether for an electric vehicle, a hybrid electric vehicle, or a conventional automobile, may be disabled or shut down under certain conditions, including normal conditions as well as fault conditions, as is known in the art. In typical systems where the vacuum source (engine) is turned off under normal conditions, the vacuum source must be restarted to raise the vacuum level whenever the vacuum level in the brake booster decreases to a lower level. This requires the engine to be started prematurely and on a more frequent basis than is required, thereby decreasing the overall efficiency of the system. Further, when vacuum levels in conventional systems become low, the brake pedal becomes stiff and provides for poor user braking feel.

SUMMARY OF THE INVENTION

It is therefore an object of the present invention to provide a system that compensates for low vacuum levels in the vacuum source (engine) based upon the deceleration of the vehicle.

It is a further object of the present invention to provide a regenerative brake-by-wire braking system with increased overall system efficiency.

In accordance with the above and other objects of the present invention, a brake-by-wire braking system is provided. The braking system includes a vacuum source, a vacuum booster and a vacuum level sensor for measuring the level of vacuum in the vacuum booster. The vacuum source is in electrical communication with a brake controller so that the brake controller can turn the vacuum source on and off and monitor whether the vacuum source is in an on or off condition. The brake controller is also in electrical communication with the vacuum level sensor to receive information indicative of the vacuum level in the vacuum booster. This information allows the brake controller to determine whether the level of vacuum is normal, below a normal operating level, or is critically low. The controller is also in electrical communication with a hydraulic booster which compensates for low vacuum levels when the vacuum level sensor determines that the level of vacuum in the vacuum booster is below the normal operating level.

These and other features of the present invention will become apparent from the following description of the invention, when viewed in accordance with the accompanied drawings and appended claims.

DETAILED DESCRIPTION OF THE PREFERRED EMBODIMENT

Figure 1:
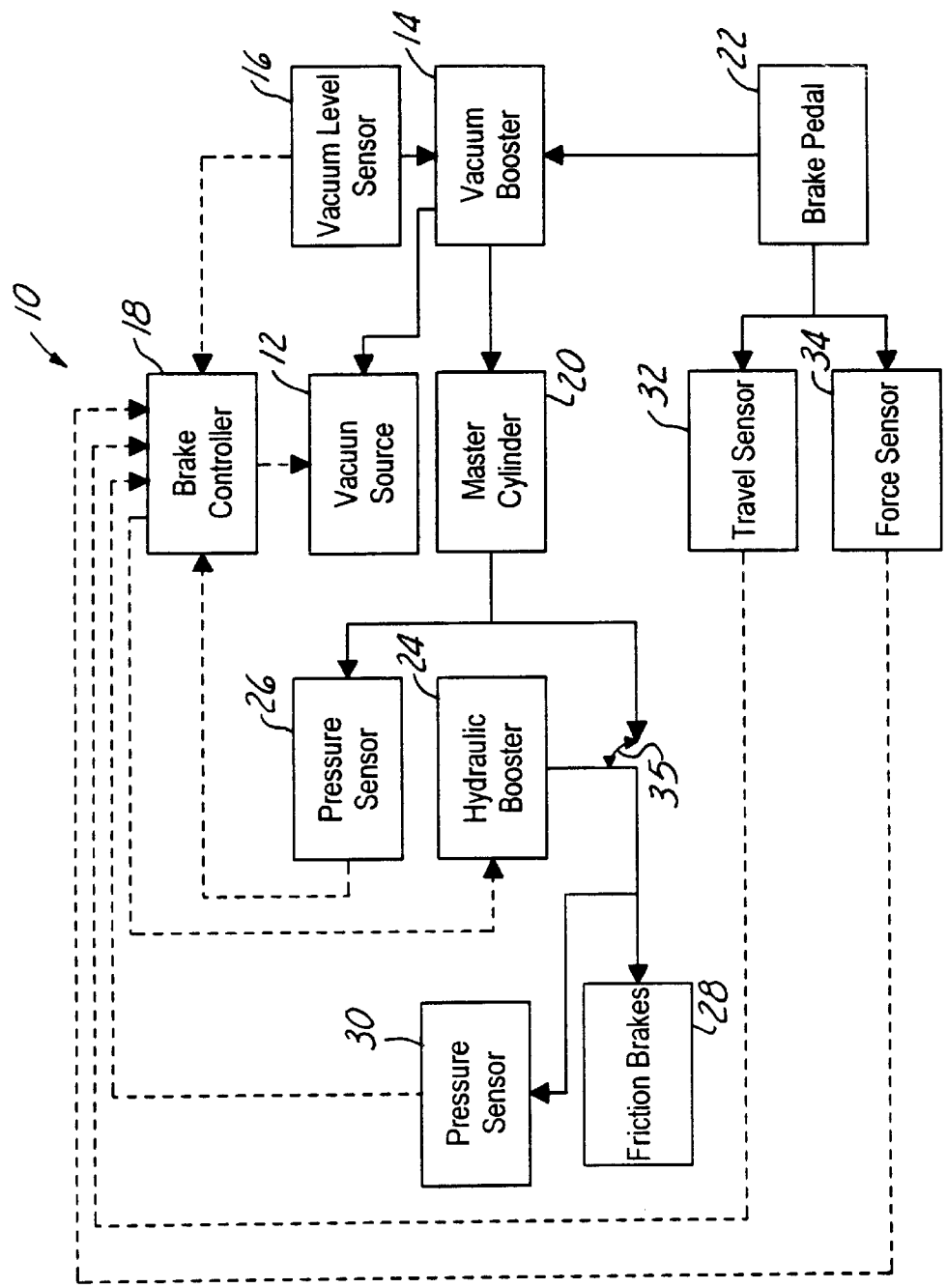
FIG. 1 is a schematic diagram of the structural components of a deceleration compensation system for a brake-by-wire braking system in accordance with a preferred embodiment of the present invention.

FIG. 1 generally illustrates the components of a regenerative brake-by-wire braking system 10 in accordance with a preferred embodiment of the present invention. The braking system 10 includes a vacuum source 12, a vacuum booster 14, a vacuum level sensor 16, a brake controller 18, a brake master cylinder 20, a brake pedal 22, and a hydraulic booster 24. While the term vacuum source 12 is used herein, it will be understood that a vacuum source is synonymous with an engine.

The disclosed system 10 may be utilized in a variety of vehicles, including a vehicle having a conventional internal combustion engine, an electric vehicle, a battery electric vehicle, a hybrid electric vehicle, or a fuel cell vehicle. Specifically, the present system can be utilized in any vehicle where the vacuum source would be interrupted, whether during normal operation such as in an HEV, a fuel cell operated vehicle, or an electric vehicle, or through a fault condition such as in a vehicle with an internal combustion engine.

The vacuum source 12 is in communication with the vacuum booster 14 to provide a vacuum supply thereto. The vacuum booster 14 is in communication with the vacuum level sensor 16, which monitors the level of vacuum in the vacuum booster 14. An indication of the vacuum level in the vacuum booster 14 is electronically fed by the vacuum level sensor 16 to the brake controller 18. The brake controller 18 is also in electrical communication with the vacuum source 12, and the hydraulic booster 24. The brake controller 18 turns the vacuum source 12 on and off and monitors whether the vacuum source 12 is in an on or off condition. While a single controller is disclosed to communicate with certain elements of the brake system 10, a separate controller can alternatively be utilized to control the vacuum source 12 and/or the hydraulic booster 24.

The vacuum booster 14 is in mechanical communication with the brake pedal 22 as is known in the art. The level of vacuum in the vacuum booster 14 thus provides the user with basic brake pedal feel. The vacuum booster 14 is in mechanical communication with the master cylinder 20 such that force applied by the user at the brake pedal 22 is sensed at the master cylinder 20 by a pressure sensor 26. The pressure sensor 26 is in electrical communication with the brake controller 18 to provide an indication of the pressure applied to the brake pedal 22. Based on the signal received at the brake controller 18 from the pressure sensor 26 indicative of the pressure at the brake pedal 22, the brake controller 18 boosts the output of the hydraulic booster 24 such that appropriate pressure is applied to the vehicle wheels by the friction brakes 28. Thus, the amount of hydraulic boost can be varied by the brake controller 18. A second pressure sensor 30 is also preferably in communication with the friction brakes 28 to provide feedback to the brake controller 18 on the hydraulic boost pressure. In a fault condition, the output of the master cylinder 20 is applied directly to the friction brakes 28, through a switching valve 35. It should be understood that while a hydraulic booster is disclosed, a variety of other boosters such as electromechanical boosters or the like may also be utilized.

The brake pedal 22 is also preferably in communication with a plurality of sensors, including a travel sensor 32, and a force sensor 34, which monitor the travel and force, respectively, of the brake pedal. The sensors 32, 34 along with pressure sensor 26 communicate the sensed information to the brake controller 18 for use in controlling the system as described in more detail below. While the two sensors described above 32, 34 and the pressure sensor 26 are specifically shown and described, it will be understood that the disclosed system 10 may utilize more, less or different sensors, as needed.

Figure 2:
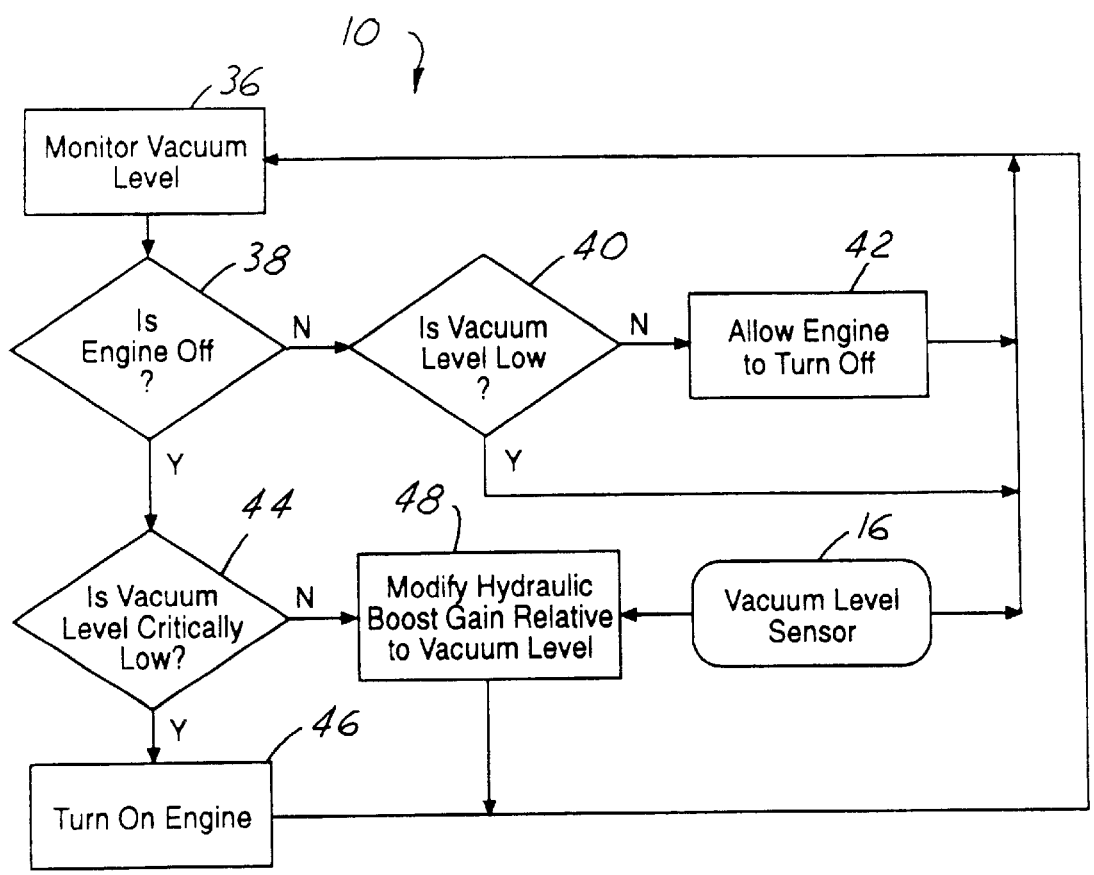
FIG. 2 is a schematic diagram of the operation of a deceleration compensation system for a brake-by-wire braking system in accordance with a preferred embodiment of the present invention.

FIG. 2 schematically illustrates the operation of the preferred braking system 10 of the present invention. As shown, the braking system 10 constantly monitors the level of vacuum in the vacuum booster 14, to determine if there has been a loss of vacuum, as generally indicated by reference number 36. The level of vacuum is monitored or measured by the vacuum level sensor 16, and transmitted to the brake controller 18 for processing. Once the brake controller 18 receives a signal indicative of the vacuum level in the vacuum booster 14, the brake controller 18 determines whether the vacuum source (engine) is in an on or off condition, as generally indicated by reference number 38. If the vacuum source is in an off condition, as detected by the brake controller 18, the brake controller 18 then determines whether the level of vacuum in the vacuum booster 14 is low, as generally indicated by reference number 40.

To determine whether the level of vacuum is low, the brake controller 18 compares the sensed vacuum level with the normal vacuum operating levels. If the level of vacuum in the vacuum booster 12 is at and not below normal operating levels, the vacuum source 12 is then allowed to be turned off (the engine may remain on for other reasons) by the brake controller 18, as generally indicated by reference number 42. Thereafter, the brake controller 18 will continue to monitor the level of vacuum in the vacuum booster 14, as generally indicated by reference number 36. By turning off the vacuum source 12 when it is not needed, system resources are conserved. If, however, the level of vacuum in the vacuum booster 14 is lower than the vacuum level at normal operating conditions, the vacuum source 12 remains on, and the monitoring of the vacuum level continues, as generally indicated by reference number 36.

If at step 38, the brake controller 18 determines that the vacuum source 12 is in an off condition, the brake controller 18 determines whether the level of vacuum is below a predetermined critically low level, as generally indicated by reference number 44. If the controller 18 determines that the vacuum level is critically low, the vacuum source 12 is turned on, as generally indicated by reference number 46, in order to increase the level of vacuum to normal levels. Thereafter, the vacuum level in the vacuum source 12 will continue to be monitored, as generally indicated by reference number 36. If the vacuum level in the vacuum booster 14 is not critically low, as determined at step 44, the controller 18 determines whether the hydraulic boost gain of the hydraulic booster 24 needs to be adjusted relative to the vacuum sensed level, as generally indicated by reference number 48.

In accordance with the present invention, at step 48, the deceleration of the vehicle can be compensated for when the level of vacuum in the vacuum booster 14 is below the normal operating levels, due to loss of vacuum source. For example, in a normal condition, as is known in the art, when the vacuum level in the vacuum booster 14 is at normal operating levels, the amount of force applied at the brake pedal 22 by the user will cause the hydraulic booster 24 to apply the same amount of braking pressure through the friction brake 28 at the wheels. However, as is also known, if the vacuum level in the vacuum booster 14 is lower than normal operating levels, the amount of pressure applied by the user at the brake pedal 22 will result in the hydraulic booster 24 applying less braking pressure at the brake wheels. Accordingly, when the level of vacuum is lower than normal operating conditions, the controller 18 actuates the hydraulic booster 24 to compensate for the loss of vacuum source. The hydraulic booster 24 compensates for loss of vacuum source, such that the amount of pressure applied to the brake pedal 22 generally equals the amount of braking pressure applied to the vehicle wheels.

Further, the system 10 also preferably utilizes a plurality of pedal sensors, such as the pedal travel sensor 32 and the pedal force sensor 34, to provide feedback to the brake controller 18 and assist in compensating for low vacuum levels during vehicle deceleration. Through the use of the brake controller 18 and one or more pedal sensors, the deceleration vs. pedal effort or deceleration vs. pedal travel can be maintained within a desired operator perception range through the increase of the hydraulic boost gain, as generally indicated by reference number 48. Through the disclosed method, the system 10 only turns on the vacuum source 12, when the vacuum level is critically low. This prevents the vacuum source from being turned on prematurely each time any vacuum source loss occurs and significantly increases the overall efficiency of the system, such as with a hybrid electric vehicle or fuel cell. Further, with respect to a vehicle using an internal combustion engine, such a system provides a fail safe if the engine were to fail.

Having now fully described the invention, it will be apparent to one of ordinary skill in the art that many changes and modifications can be made thereto without departing from the spirit or scope of the invention as set forth herein.

What is claimed is:

1. A method for compensating for low vacuum levels in a brake-by-wire system, comprising:
    monitoring a vacuum level in a vacuum booster;
    determining whether a vacuum source is in an on or off state;
    determining whether the vacuum level is critically low;
    modifying a boost gain relative to the vacuum level when the measured vacuum level is not critically low;
    whereby the vacuum source can remain in an off state until the measured vacuum level is at a critically low level.

2. The method of claim 1, wherein the modified boost gain is a hydraulic boost gain.

3. The method of claim 1, wherein the modified boost gain is an electromechanical boost gain.

4. The method of claim 1, wherein the step of determining whether the vacuum level is critically low is performed while the vacuum source is off or failed.

5. The method of claim 4, wherein the vacuum level in the vacuum booster is monitored by a vacuum level sensor.

6. The method of claim 5, further comprising determining whether the vacuum level is lower than a normal operating level when the vacuum source is in an on state.

7. The method of claim 6, further comprising turning the vacuum source off when the vacuum level is at or above said normal operating level.

8. The method of claim 7, further comprising:
    continuing to monitor the vacuum level if the vacuum level is low and the vacuum source is in an on state.

9. The method of claim 1, further comprising detecting a position of a brake pedal.

10. A brake system utilizing regenerative braking and mechanical braking, comprising:
    a vacuum source;
    a vacuum level sensor for detecting a level of vacuum in a vacuum booster;
    a controller in communication with said vacuum source for determining whether said vacuum source is on or off, said controller being in communication with said vacuum level sensor to receive information on said vacuum level; and
    a hydraulic booster in communication with said controller for compensating for vehicle deceleration when said vacuum level sensor determines that said vacuum level is below a normal operating level;
    wherein said controller turns off said vacuum source when said level of vacuum is above said normal operating level.

11. The system of claim 10, wherein the brake system is incorporated into one of the following:
    a hybrid-electric vehicle, an electric vehicle, a fuel cell, or a conventional vehicle with an internal combustion engine.

12. The system of claim 10, further comprising a brake pedal and at least one brake pedal sensor that is in communication with said controller.

13. The system of claim 12, wherein said at least one brake pedal sensor is selected from the following: a brake pressure sensor, a brake travel sensor, or a brake force sensor.

14. The system of claim 10, wherein said controller allows said vacuum source to shut off when said level of vacuum is at said normal operating level.

15. The system of claim 14, wherein said controller turns said vacuum source on when said level of vacuum is at or below a critically low level.

16. A system for compensating for low vacuum levels in a brake-by-wire system, comprising:
    a vacuum source;
    a vacuum level sensor for detecting a level of vacuum in a vacuum booster;
    a master cylinder having a pedal sensor associated therewith for detecting an amount of pressure applied at a brake pedal;
    a booster in communication with a controller for compensating, based on input from said controller, for said level of vacuum when said vacuum level drops below a normal operating level; and
    a brake controller in communication with said vacuum source to control and monitor actuation of said vacuum source, said brake controller being in communication with said pedal sensor in order to receive information on said applied pressure;
    wherein said controller turns off said vacuum source when said level of vacuum is above said normal operating level.

17. The system of claim 16, wherein the system is incorporated into one of the following:
    a hybrid-electric vehicle, an electric vehicle, a fuel cell, or a conventional vehicle with an internal combustion engine.

18. The system of claim 16, wherein said at least one brake pedal sensor is selected from the following: a brake pressure sensor, a brake travel sensor, and a brake force sensor.

* * * * *